(No Model.)

F. VAN BENTHUYSEN.
REDUCIBLE LINING FOR JOURNAL BEARINGS.

No. 479,039. Patented July 19, 1892.

WITNESSES:
S. B. Brewer
E. T. Chapman

INVENTOR:
FRANK VAN BENTHUYSEN,
by William W. Loco
ATTORNEY.

UNITED STATES PATENT OFFICE.

FRANK VAN BENTHUYSEN, OF ALBANY, NEW YORK.

REDUCIBLE LINING FOR JOURNAL-BEARINGS.

SPECIFICATION forming part of Letters Patent No. 479,039, dated July 19, 1892.

Application filed February 12, 1892. Serial No. 421,335. (No model.)

*To all whom it may concern:*

Be it known that I, FRANK VAN BENTHUYSEN, of the city and county of Albany, in the State of New York, have invented new and useful Improvements in Reducible Linings for Journal-Bearings, of which the following is a specification.

My invention relates to improvements in reducible linings for journal-bearings; and it consists of a shell or casing having a bore of helicoidal form whose successive turns are made with a regularly-decreasing diameter, so as to produce in effect a coniform bore, and a helically-bent bar or ribbon of suitable metal, whose outer surface is made to correspond to the bore of said casing and whose inner bore is made to suit the journal which is to rotate in said bearing, said casing and lining being both provided with means whereby said lining will be carried inwardly into said casing when said lining is revolved in the required direction.

The object of my invention is to provide a lining for journal-bearings which, while readily reducible in the diameter of its bore, will afford a bearing for the entire circumference of a journal that is fitted to rotate therein; and I attain this object by the means illustrated in the accompanying drawings, which, being herein referred to, form part of this specification.

Figure 1:
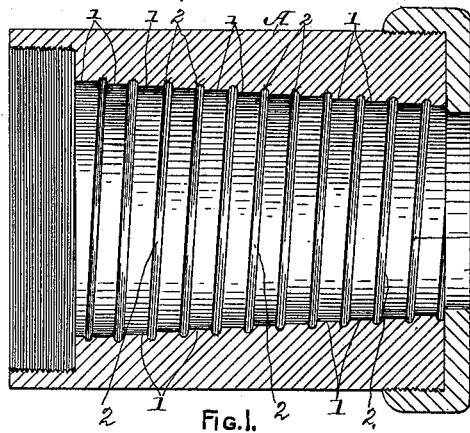
Figure 2:
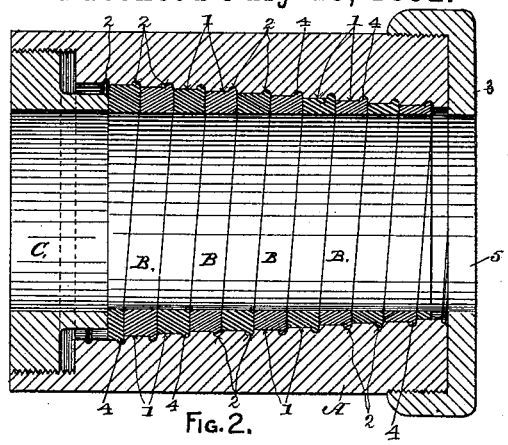
Figure 5:
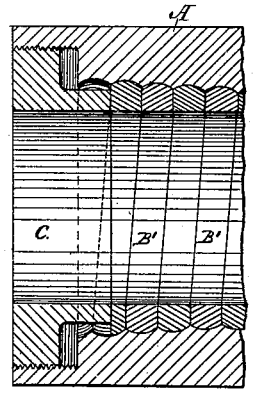
Figure 3:
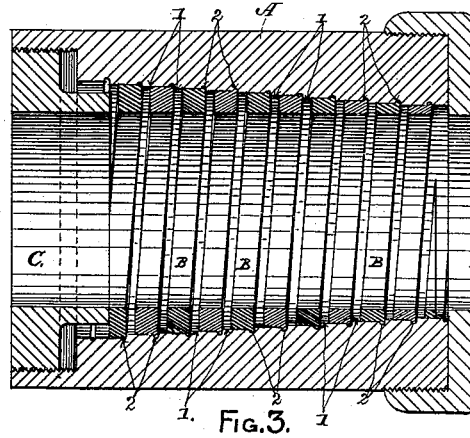
Figure 4:
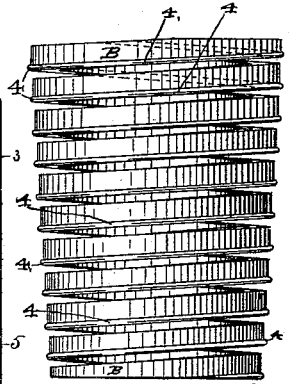
Figure 6:
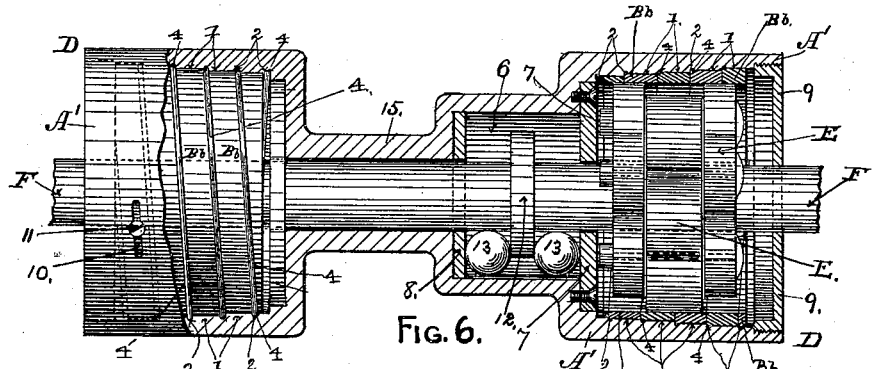

In the drawings, Figure 1 is a longitudinal section of a casing or shell for a journal-bearing embodying my invention. Fig. 2 is a longitudinal section of a journal-bearing embodying my invention and showing joints between the successive turns of the helical lining in close contact. Fig. 3 is a like section showing the joints of the helical lining open. Fig. 4 is a side elevation of the helical lining shown in Fig. 3 detached from the casing. Fig. 5 is a longitudinal section, on a reduced scale, of a modified form of my helical lining and a casing adapted to said modification; and Fig. 6 is a longitudinal section, partly in side elevation, of my invention as adapted for the wheels of bicycles provided with roller-bearings.

As represented in the drawings, A designates the casing or shell for a journal-bearing, which may have a cylindrical or other preferred form, and it may be made in a single piece or so as to part longitudinally, according to the requirements of the machinery in which it is to be used. The bore of said casing decreases uniformly in diameter from its outer to its inner end, the diminishment being effected by a series of helicoidal steps 1 of uniformly-decreasing diameters to produce walls which are parallel to the central axis of said casing, as shown in Figs. 1, 2, 3, and 6, or walls having a slight concavity in the direction of the length of said casing.

As shown in Figs. 1, 2, 3, and 6, the steps 1 are separated from each other by a helical groove 2, for a purpose hereinafter explained. The smaller end of said casing is provided with a cap 3, which, when the journal projects through said cap, should have a central opening 5 to fit the diameter of the journal, and when desirable a leather washer or annulus may be secured by said cap against the corresponding end of the casing A for the purpose of preventing dirt and grit from entering at that point to injure the journal.

While I have shown two different forms of walls of the helicoidal steps, it is manifest that other equivalent forms may be employed to effect the same.

B designates my reducible lining, which may be made of any suitable metal or composition; but preferably it is made of metal having a proper degree of resilience and endurance to wear. It is commonly made of a metallic ribbon of uniform width and a uniformly-tapering thickness that conforms to to the varying diameters of the walls of the helicoidal steps 1 of the casing A, in which said lining is designed to fit snugly.

In the form of lining shown in Figs. 2, 3, 4, and 6 a helical rib 4 is formed on the outer face of the lining B to correspond to the position of the groove 2 of said casing, so that when a proper rotatory motion is imparted to the lining B the latter will be correspondingly screwed into or out of the bore of the casing A, and it is obvious that when said lining is screwed inwardly into said casing the lining B will have the diameter of its bore reduced correspondingly. In Fig. 5 the lining B' has its outer face made convex to fit the concave form of the walls of the helicoidal steps of its casing, said lining being made with a tapering thickness of the ribbon, and the diminution of the diameter of the bore of said lining is effected in the manner hereinbefore explained in respect to the lining B. When the lining is made to leave a space between the successive turns, said space forms a receptacle for containing the lubricant used on the bearing. In either form of my invention the compressible lining should be made shorter than the casing in which it is contained, so as to afford space for screwing said lining inwardly to effect a reduction in the diameter of the bore of the same.

C designates a follower or ring fitted to screw into the outer end of the casing A, said follower being designed for the purpose of bearing against the larger end of the lining B, so as to prevent the latter from being accidentally screwed outwardly.

In the form of my invention shown in Fig. 6, which is a double bearing for the hub of a wheel or other device fitted to revolve on a stationary shaft, but which may be used for a stationary bearing for a revoluble shaft, D designates the hub of a wheel or a stationary bearing, having at each end a casing A' for containing a roller-bearing E, which may be of the form for which Letters Patent of the United States No. 459,774 were granted to me September 22, 1891, as shown in the drawings hereto attached; or it may be of any other preferred form of roller-bearing. Each of said casings is preferably made of a greater bore than that of the intermediate neck 5, whose bore should be sufficiently large to prevent any frictional contact with the portion of the shaft which passes through said neck. The bore of the casings A' is made substantially the same as that of the casing A, hereinbefore described, and each of said casings is provided with a reducible lining B^b of a similar construction to the lining B, hereinbefore described.

Immediately succeeding the bore of one of the casings A' there is a chamber 6, which is separated from said bore by a tempered annulus 7, which forms the inner end of said bore, and at the inner end of the chamber 6 I preferably place another tempered annulus 8 to form the inner end of said chamber. A screw-cap 9 forms a closure for the outer end of the bore of each casing A', and a spirally-slotted opening 10 is formed in the side of each of said casings to correspond with the inclination of the helicoidal steps, and through each of said slotted openings a binding-screw 11 is fitted to engage in the lining B^b for the purpose of securing the same from acquiring a rotatory movement. A shaft F, either stationary or revoluble, passes through the bore of the neck 5, chamber 6, and both of the casings A', and is provided with a circumferential flange 12, which is arranged to be located in the chamber 6. Between said flange and each of the annuluses 7 and 8 balls or rollers 13 are interposed for the purpose of forming a thrust-bearing to resist an endwise strain on the shaft F.

My invention is operated in the following manner: When the bore of the lining, either B, B', or B^b, becomes worn in its bore, so that a perceptible shaking of the journal therein occurs, the follower C or the screw-cap 9 should be removed and the lining screwed inwardly until the latter has its bore reduced to the required diameter. Then the closure for the outer end of the casing can be replaced and the bearing will be in condition for working.

What I claim as my invention, and desire to secure by Letters Patent, is—

1. A reducible lining for journal-bearings, consisting of a metallic ribbon which tapers uniformly in thickness from one end to the other, said ribbon being coiled in a helicoidal form, so as to produce a bore of uniform diameter, said lining being uniformly reduced in its outer diameter from one end of the coil to the other and having its outer face provided with means, substantially as described, for adapting said lining to be screwed into the corresponding bore of a casing, as and for the purpose herein specified.

2. The combination of a reducible lining for journal-bearings, which consists of a metallic ribbon, which tapers uniformly in thickness from one end to the other and is coiled in a helicoidal form, the bore of said coil having a uniform diameter, and the outer face of said coil decreasing uniformly in diameter from one end of the coil to the other, and a casing whose bore is formed by a series of helicoidal steps corresponding to the outer surface of said lining, the bore of said casing decreasing uniformly in diameter, by means of said helicoidal steps from one end to the other, as and for the purpose specified.

3. The combination of a reducible lining for journal-bearings, made of a metallic ribbon of uniform width, but tapering in thickness from one end to the other and having on one face a longitudinal rib, said metallic ribbon being coiled in a helicoidal form to produce a bore of uniform diameter and the said rib being arranged on the outer face of said lining, and a casing for containing said lining, whose bore is composed of a series of helicoidal steps corresponding to the formation of the outer face of said lining and provided with a helicoidal groove for receiving the rib of said lining, as and for the purpose herein specified.

4. The combination of a lining for journal-bearings, which is made in a helicoidal form, whose outer diameter decreases uniformly from one end to the other, a casing whose bore is formed of a series of helicoidal steps fitted to receive said lining, and means, substantially as herein described, for securing said lining in said casing, as and for the purpose herein specified.

FRANK VAN BENTHUYSEN.

Witnesses:
 WM. H. LOW,
 S. B. BREWER.